Oct. 18, 1932.    G. H. WALKER ET AL    1,883,134
TACKLE BOX
Filed Feb. 28, 1930

INVENTOR
Glen H. Walker
BY  Ira L. Cole
Chappell & Earl ATTORNEYS

Patented Oct. 18, 1932

1,883,134

UNITED STATES PATENT OFFICE

GLEN H. WALKER, OF KALAMAZOO, MICHIGAN, AND IRA L. COLE, OF MADISON, WISCONSIN, ASSIGNORS TO SHAKESPEARE COMPANY, OF KALAMAZOO, MICHIGAN

TACKLE BOX

Application filed February 28, 1930. Serial No. 432,005.

The main object of this invention is to provide a tackle box which is well adapted to receive a plurality of artificial baits or lures, the baits or lures being independently housed so that their hooks cannot become entangled, and at the same time they are simultaneously exposed so that the desired bait or lure may be readily selected.

A further object is to provide a tackle box having the above advantages which is of relatively large capacity, that is, the space therein is effectively utilized.

Objects pertaining to details and economies of the invention will definitely appear from the description to follow. The invention is defined in the claims.

A structure which embodies the features of the invention is clearly illustrated in the accompanying drawing, in which.

Figure 1:
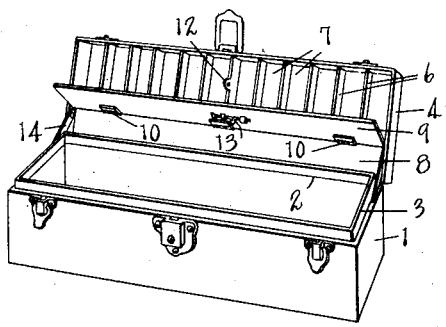
Fig. 1 is a front perspective view of our improved tackle box opened, the movable trays usually provided not being illustrated.

In the embodiment illustrated the box body 1 is formed of sheet metal as is usual in boxes of this character, and is inwardly offset at 2 adjacent its upper edge providing a cover shoulder. The edges 3 of the box walls are turned inwardly to reinforce the edges and present a rounded finish.

The cover 4 is of substantial depth or chambered and is hinged at 5 to the box body so that it closes upon the shoulders 2 of the box body.

Within the cover we arrange a plurality of transverse partitions 6 disposed in parallel spaced relation providing a plurality of compartments 7. The compartment front wall 8 is secured within the cover to extend longitudinally within the cover across the rear portions of the partitions. This fixed wall is spaced from the edges of the cover so that when the cover is closed the fixed wall engages the upper edge of the box body.

Figure 2:
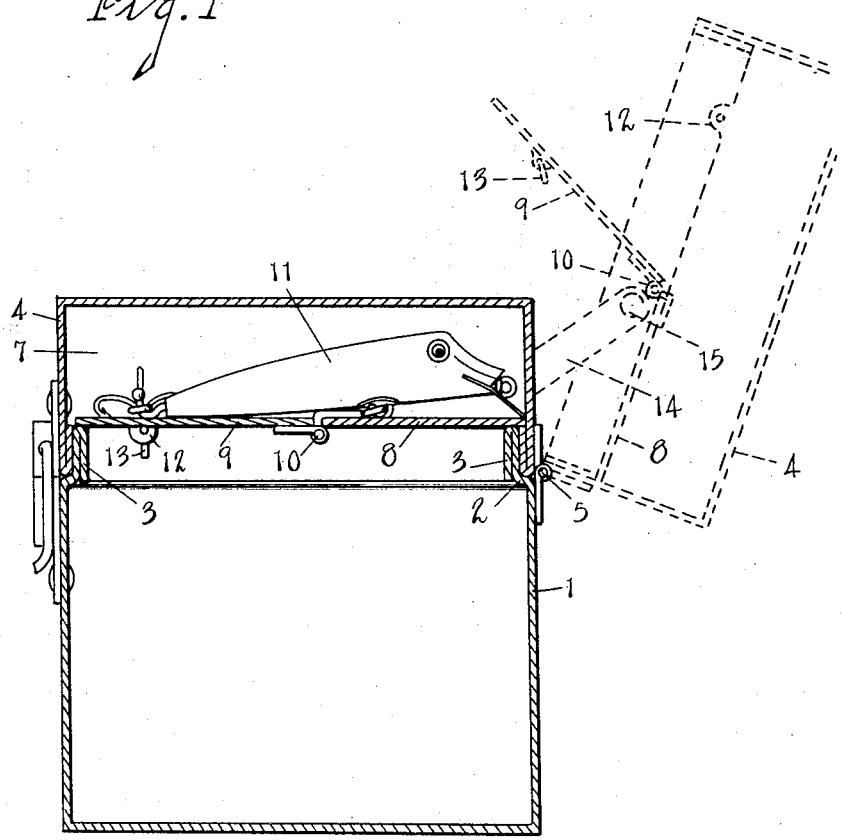
Fig. 2 is a vertical transverse section with the cover of the box shown in closed position by full lines and in open position by dotted lines, an artificial bait being shown in one of the compartments.

The closure 9 is hinged at 10 to the front edge of the longitudinal partition wall or front wall of the compartments, and adapted to close against the front edges of the compartments and to lie when closed in the plane of the fixed wall as shown in Fig. 2. When the closure 9 is open the several compartments are open and substantial portions of the contents thereof, as the bait or lure 11, are exposed so that the desired article may be readily selected.

To retain the closure in closed position one of the partition walls is provided with a keeper 12 while the closure 9 is provided with a bolt 13 engageable with this keeper, thereby retaining the closure in closed position and allowing the cover to be manipulated as an ordinary cover.

The cover is supported in its open position by the links 14 which are pivoted to the cover at 15 and slidably engaged with the end walls of the box. The details of this connection, however, are not shown. This supports the cover in a rearwardly inclined forwardly facing position as shown in Fig. 2 so that the contents of the compartments are exposed and are fully accessible.

With the parts thus arranged we provide a series of compartments or pockets for artificial baits or lures whereby each lure is separately supported, thereby preventing the entangling of hooks and marring of the baits. At the same time they are fully accessible and space is utilized which in many tackle boxes has heretofore been wasted.

Having thus described our invention what we claim as new and desire to secure by Letters Patent is:

1. In a tackle box, the combination with a box body having an external shoulder at the top, of a cover hinged to said body to close upon said shoulder, means for supporting said cover when open in a rearwardly inclined forwardly facing position, a series of spaced partitions disposed transversely within said cover with their outer edges in spaced relation to the edges of the cover, a fixed compartment front wall disposed longitudinally within the cover across the rear portions of said transverse partition walls providing a plurality of compartments, and a closure hinged at one edge to the front edge of the longitudinal partition wall to expose when open the several compartments, and when the cover is closed to close upon the upper edge of the body of the box.

2. In a tackle box, the combination with a box body, of a chambered cover hinged to said body, a series of spaced partitions disposed transversely within the cover chamber, a fixed compartment front wall disposed longitudinally within the cover chamber and extending across the rear portions of said transverse partitions providing a plurality of compartments open above said front wall, and a closure coacting with said front wall to close the several compartments.

In witness whereof we have hereunto set our hands.

GLEN H. WALKER.
IRA L. COLE.